(12) United States Patent
Tanaka (10) Patent No.: US 7,066,315 B2
(45) Date of Patent: Jun. 27, 2006

(54) SORTING METHOD AND APPARATUS (75) Inventor: Nobuhiro Tanaka, Saitama (JP)

(73) Assignee: Chuo Logistics Engineering Co., Ltd., Saitama (JP)

( * ) Notice: Subject to any disclaimer, the term of this patent is extended or adjusted under 35 U.S.C. 154(b) by 23 days.

(21) Appl. No.: 10/484,527

(22) PCT Filed: Jul. 17, 2002

(86) PCT No.: PCT/JP02/07274

§ 371 (c)(1),
(2), (4) Date: Jan. 16, 2004

(87) PCT Pub. No.: WO03/008306

PCT Pub. Date: Jan. 30, 2003

(65) Prior Publication Data

US 2004/0200692 A1    Oct. 14, 2004

(30) Foreign Application Priority Data

Jul. 18, 2001 (JP) ............................ 2001-218692
Jul. 18, 2001 (JP) ............................ 2001-218713

(51) Int. Cl.
*B65G 37/00* (2006.01)
(52) U.S. Cl. ................ 198/349; 198/358; 198/349.6
(58) Field of Classification Search ............ 198/530.3, 198/580, 435, 637, 370.01, 358, 349, 349.6, 198/530; 414/273, 331; 209/583, 912
See application file for complete search history.

(56) References Cited

U.S. PATENT DOCUMENTS

| 3,610,159 A | * | 10/1971 | Fickenscher | ................. 198/349 |
| 3,627,153 A | * | 12/1971 | Brummett et al. | ....... 198/349.6 |
| 4,397,384 A | * | 8/1983 | Nohren, Jr. | .................. 198/358 |
| 4,410,078 A | * | 10/1983 | Shields et al. | .............. 198/358 |
| 4,561,060 A | * | 12/1985 | Hemond | ...................... 198/358 |
| 5,411,151 A | | 5/1995 | Sasada | |
| 5,628,162 A | * | 5/1997 | Kreusch et al. | ............. 198/349 |

FOREIGN PATENT DOCUMENTS

| JP | 62171804 | 7/1987 |
| JP | 416403 | 1/1992 |
| JP | 020873 | 1/2000 |
| JP | 0233809 | 8/2000 |
| JP | 1184420 | 7/2001 |

* cited by examiner

Primary Examiner—James R. Bidwell
(74) Attorney, Agent, or Firm—Orum & Roth LLC (57) ABSTRACT

A sorting apparatus 10 which uses a sorting/conveying line 11 with branch destination, including a branch line 22 for sorting the commodities more than a quantity necessary for the branch destination and a surplus article returning line 23 for returning surplus commodities after removing a required quantity to the sorting/conveying line 11.

6 Claims, 6 Drawing Sheets

SORTING METHOD AND APPARATUS

TECHNICAL FIELD

The present invention relates to a sorting method and its apparatus as well as an inspection and assurance system.

BACKGROUND ART

Conventionally, a sorting apparatus sorts commodities of required quantity in answer to an order from a retailer during the process of a business transaction between a supplier as the seller and a retailer as the buyer. Generally, such sorting apparatus includes a stock picking process at an upstream side and a conveying/sorting process at a downstream side (DC type).

A conventional sorting apparatus has the following problems.

(1) In recent years, segmented delivery from each team to every individual in the co-op is seen. Thus, it becomes necessary to cope with small order processing. As a result, problems in processing occur such that conveying and sorting number at the downstream side becomes short.

(2) Integration of functions such as common use of the physical distribution center, lumping conveying, or the like are advanced. It is necessary to perform sorting in every store (TC type) of the necessary articles carried in by another supplier in addition to stock picking type DC. Carrying in TC article has two systems; one being a total delivery system for every article item and another being a consolidated packing delivery system for every store. Center passing charges of these systems is different. As to the consolidated packing delivery system for every store, delivery information processing such as inspection of contents, delivery forming and so forth are included.

(3) Further, in the downstream, a label is attached to a delivery box such as a folding container or a plastic container after sorting in accordance with unique codes or formats of a client having multiple stores. Working requirements for inserting accessories such as a delivery detail listing or a pamphlet becomes large. Working is complicated in order to cope with different requirements of different clients. For this reason, the load of inspection work increases. In case of error, a penalty is added, and a large number of serious problems on physical distribution quality are created.

(4) When retailers purchase commodities from purchase resources such as a commission agent, the situation that the commodities ordered are not delivered by the type and quantity ordered frequently occurs For example, there is no ordered commodities, the quantity is short, the ordered commodities are delivered to another store, etc. Therefore, since loss due to shortage is large, actual commodity inspection is necessarily performed at a storefront under these circumstances.

In this case, commodity inspection at each store is troublesome, which results in inefficiency. Further, the situation that an unskilled sales person carries out commodity inspection frequently occurs, which frequently results in a problem in that it takes significant time for retrieving an actual commodity from a trade name, or an error occurs in commodity inspection itself.

Further, "business transaction" is ordinarily performed between the supplier as the seller and the retailer as the buyer in the order of order, delivery, commodity inspection, clearance and payment. The physical distribution is generally defined as a subcontracted business for the seller.

In recent years, retailers are large-scaled due to multiple store development, which requires reduction of purchase price in order to achieve quantity merit due to large scale purchasing and large scale selling. The retailer has adopted a POS system (JAN barcode settlement) to allow grasping of marketable commodities in real time. Thereby, daily orders for each store could be made easy.

Alternatively, the supplier as the seller (commission agents or manufacturers) performs an order reception confirming processing by each order reception processing computer to transmit shipment information to a "physical distribution site".

The management of "the physical distribution site" has two cases; one being a directly-controlled own company physical distribution and another being a subcontract physical distribution company. In recent years, there is a tendency that the physical distribution is consigned to a dedicated physical distribution company with a cost borne by the seller in order to reduce the physical distribution costs. The "consigned contents" include various scenarios such a case that the seller provides the facilities and only in-house work and delivery work are consigned to a physical distribution company, a case that a physical distribution company is consigned with full services including the facilities, or the like. In many cases, the physical distribution company makes contracts with the seller for in-house business or delivery business not as a party for contract but as a subcontractor of the seller.

There occurs a problem that an order including many types of commodities in small numbers thereof increases and "the commodity inspection work is complicated and diversified at a time of commodity delivery". The commodity inspection is a task involving making confirmation about matching/mismatching between delivered actual commodities and delivery forms therefor to achieve matching and secure "a delivery settlement". However such work imposes a large burden on the physical distribution company due to the work required for error correction, increases in time for being present at the inspection, and the like.

(a) A driver of the physical distribution company is consigned with only the distribution business, but that person is required to be present until the content or commodity inspection is completed, which results in time loss for that person.

Further, a handling rule for the case that mismatching occurs between an actual commodity and a form therefor is unclear. For example, in the case that the number of actual commodities is larger than the number on the form, the surplus must be returned back and a returned commodity form must be written. When the number of actual commodities is smaller than the number described on the form, the form is ordinarily corrected under the presence of both parties and signature or sealing is required in some cases. Where the delivery is completed with only the form correction is a good case, and such a problem that delivery completion is rejected until shortage is supplemented or delivered occurs in rare cases.

When a reception person of the retailer is a professional, a relatively high efficiency can be achieved. But, when that person is a beginner, such as a new person or a temporary employee, it may occur frequently that their commodity inspection work is poor and their handling of mismatching cases is performed inefficiently. Such a situation may be a situation where persons who do not have responsibility are present just formally. "Unclearness in clearance" causes serious conditions such as notification of shortage to the supplier after delivery, leading to a loss of reliability.

(b) The retailer requires accurate correspondence to the seller on the occasion of multiple article items, small quantity and multi frequent order.

If the articles are delivered in random order according to every supplier, this causes interference of service, and a dedicated person for reception becomes the burden of the retailer. Consequently, TC (Transfer Center) establishment is required. The TC has a function of dealing with stock article and articles carried in from another supplier. When a TC is introduced, it is necessary for the supplier to perform "inspection forms correction" and "lumped delivery".

Delivery error or shortage (short to the order) is impermissible. In TC, commodity inspection is performed, "excess and deficiency adjustment" of article item/quantity is performed, and agreement between "order=form=delivered actual commodity" is required.

The retailer performs management of the TC. In many cases, a related distribution company is used. Its working capital is a "center passing fee" tolled from the supplier. Under the contract, this center passing fee is reduced from the commodity purchase price.

(c) The supplier writes the form on the basis of only the receipt of order information while taking count of sales to the buyer. Confirmation of excess and deficiency of the actual commodity is considered the work of the distribution field or procurement section. For this reason, such a case that there are many transactions which appear due to the buyer's selfishness such as cancellation of a returned commodity and a delivery commodity caused by the retailer is exemplified.

Thus the physical distribution company as the subcontractor of a party for contract is compelled to perform work other than delivery contract such as "inspection presence" with no delegation of the clearance right.

This indicates problems of actual commodity clearance and difficulty of resolution. These problems are caused by computerization and the speed up of shipping order work and receipt of order work.

An inspection machine or a sorting machine is introduced for in-house work. Accuracy may be achieved by such mechanization. However, accuracy stays level within the warehouse. The obtained data as it is cannot be used as "inspection clearance data" for the physical distribution computer.

DISCLOSURE OF THE INVENTION

An object of the present invention is to provide an inspection and assurance system for performing inspection and assurance accurately and efficiently while sorting commodity delivered from a supplier.

Another object of the present invention is to provide an inspection and assurance system in which there is provided a delivery inspection center between a supplier and a retailer and the delivery inspection center performs inspection and assurance instead of the supplier and the retailer.

The present invention is a sorting method which uses a sorting/conveying line with a branch destination comprising the steps of sorting the commodities more than a quantity necessary for the branch destination and returning surplus commodity after removing necessary quantity to the sorting/conveying line.

Further, the present invention is a sorting apparatus which uses a sorting/conveying line with a branch destination comprising a branch line for sorting the commodities more than quantity necessary for the branch destination, and a surplus article returning line for returning surplus commodities after removing necessary quantity to the sorting/conveying line.

Further, the present invention is an inspection and assurance system in which a delivery inspection center is provided between a plurality of suppliers and a plurality of retailers to sort delivered commodities from the suppliers according to order information of the retailers on sorting/conveying lines of the delivery inspection center, to collect actual commodity information passing the sorting/conveying lines in the delivery inspection center, and to calculate sorting results for every retailer and delivery results for every supplier. Besides reporting the sorting results of the retailer to the retailers concerned, the sorting results of the retailers relating to the delivered commodities of each supplier are reported to the supplier concerned.

Moreover the present invention is an inspection and assurance system which establishes shipment zones for every return destination trader at the second sorting/conveying step branched from the sorting/conveying line, and compiles and outputs return sorting results for every retailer and return results for every supplier by actual commodity input identification means of sorted commodity for the return destination trader.

BEST MODE FOR CARRYING OUT THE INVENTION

Figure 1:
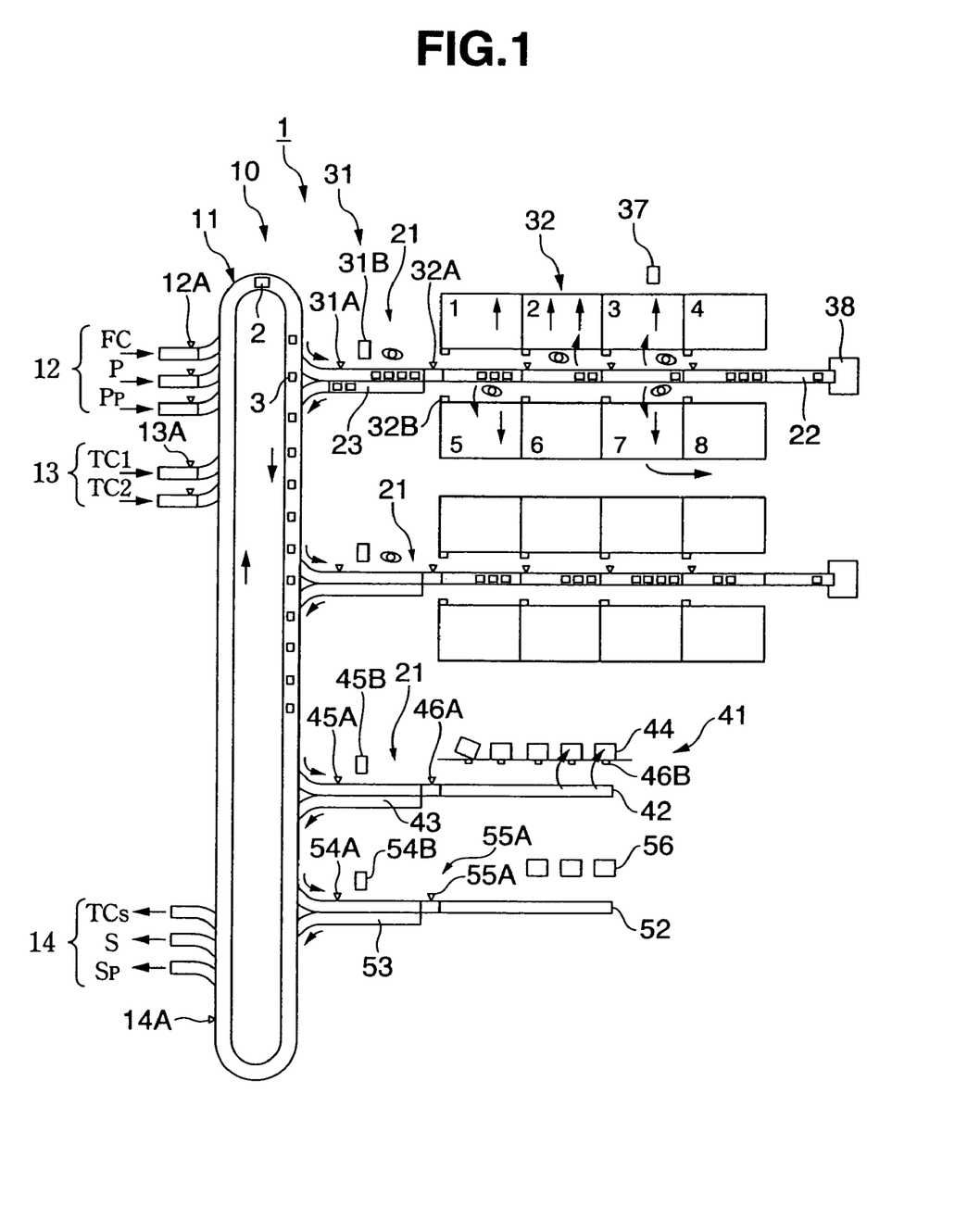
FIG. 1 is a schematic diagram showing a first embodiment of a sorting apparatus of a delivery inspection center.
Figure 4:
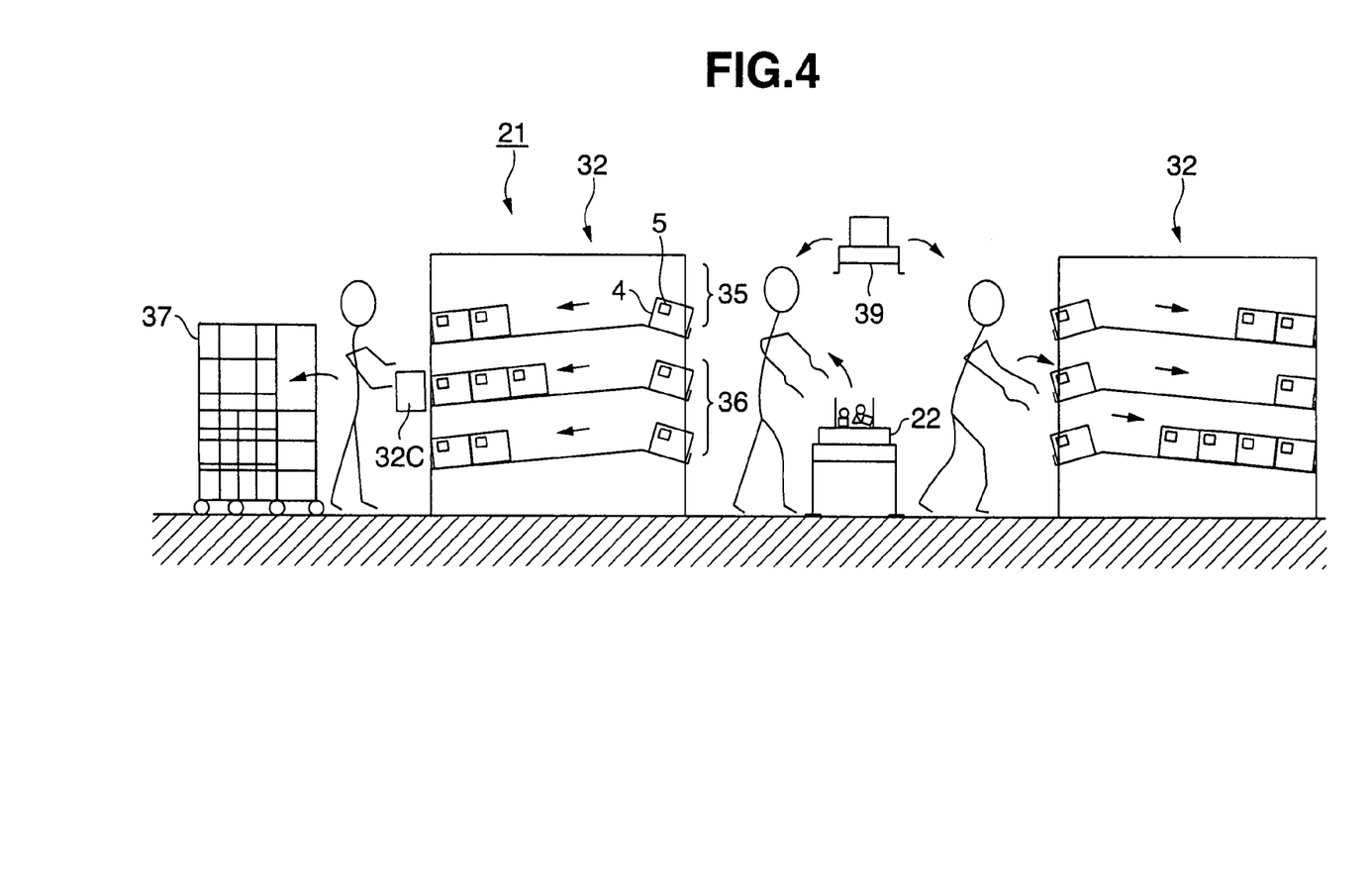
FIG. 4 is a schematic diagram showing a second sorting/conveying line.

First Embodiment (Sorting Method and Apparatus)(FIGS. 1, 4)

A delivery inspection center 1 of FIG. 1 is provided between a plurality of suppliers and a plurality of retailers and has a sorting apparatus 10.

The sorting apparatus 10 has a first sorting/conveying line 11 and a second sorting/conveying line 21. The second sorting/conveying line 21 has a fractionating zone 31 and a segmenting zone 32, or has a large case article sorting line 41.

(First Sorting/Conveying Line 11)

The first sorting/conveying line 11 has a stock article (DC article) supplying section 12 as a place for stock and a loop shaped sorting conveyer circulating commodities supplied from another supplier's article (TC article) supplying section 13. These commodities are sorted into a plurality of the second sorting/conveying lines 21 (branching destinations). Further, the first sorting/conveying line 11 has a surplus article branching section 14 for returning the surplus articles which is not necessary for the second sorting/conveying line 21. Reference numeral 14A indicates a bar code reader BCR.

A control computer scans the type bar code and so forth attached to the individual commodity with the bar code readers BCR 12A, 13A at the stock article supplying section 12 and another supplier's article supplying section 13 to instruct the branch destination. The necessary total number 0 of each branch destination of each commodity is known previously from compiled data. Further, since packaging contents of individual actual commodity (quantity number in the case of single article) is known. The quantity more than the necessary amount is rounded in "case unit" in every branch destination to be branched. In FIG. 1, a reference numeral 2 indicates a single article case, a reference numeral 3 indicates the single article or a parted container for a plurality of types.

No consideration is made with respect to the kind of sorting conveyer and combination thereof.

The sorting conveyer is formed in a loop shape. This is because the sorting conveyer can not be stopped immediately when the fractionating zone 31 is filled with the articles, and the articles after branch allocation can be made to go round the conveyer.

The sorting system of the present invention can drive in two ways.

"DC": Distribution Center Function. Stock/Picking/Sorting.

FC line: The line to which case article of one layer unit inflows.

P line: The line to which the article inflows from a case save division not more than one layer.

$P_p$ line: The line to which the article inflows from independent parted container save division.

S line: The line for returning the surplus article for the case save division.

$S_p$ line: The line for returning the surplus article for the parted container save division.

"TC": Transfer Center Function. The function for dealing with the articles carried in by another supplier, not a stock article.

TC1: The line to which the article is carried in from another company inflow.

TC2: The same as above. The single article trader (second sorting object) uses TC1, and the consolidated packaging supplier uses TC2. In the case of presence of inspection assurance, the article is dealt within every case, while in the case of absence of inspection assurance, content inspection is performed at the second sorting zone. Thus, it is possible to separate usage.

$TC_s$: The line for returning surplus articles of TC supplier article. In some cases, foods dealt by the co-op and so forth are delivered in an excess amount.

It is possible to separate operation times such as for example DC operation in the morning and TC operation in the afternoon.

It is possible to use the same sorting/conveying line for both DC and TC functions. Further, the sorting/conveying line can perform distribution quantity administration control of the articles for every case unit, so that this is very efficient.

(Second Sorting/Conveying Line 21)

(1) Fractionating Zone 31

With respect to a single item article or consolidated packaging article (case style of packing unit) sorted by the first sorting/conveying line 11, "taking out the necessary total number O/return of unnecessary surplus article (singleness of container style of packing)" is performed in the fractionating zone 31.

In the fractionating zone 31, the bar code reader BCR 31A scans the branched article on a zone conveying line 22 depending on an instruction from a control computer. A taking out indicator 31B performs an indication of necessary quantity and unnecessary surplus article elimination for "every case unit". The operator performs pushing processing of the surplus articles to a "surplus article return line 23", after packing them into a plastic container (fiber board may be used) in accordance with indication guidance such as inspection, repacking or labeling or the like. The article necessary for "case unit" is sent out to the segmenting zone 32 automatically (pass/catch control).

(2) Segmenting Zone 32

The segmenting zone 32 comprises a shipment zone that is segmented into a plurality of stores or categories. Each zone has, as shown in FIG. 4, a singleness compartment 35 and a case compartment 36. The commodity taken out by one piece unit from inside of a single item article accommodating case, or the container, is dropped into the singleness compartment 35. The single item article accommodating case is dropped into the case compartment 36 by the case unit. A roll box, or pallet, 37 is disposed at a deacquisition opening on a rear surface of each zone by delivery unit for a retailer. An empty bucket accommodating roll box 38 is disposed at a terminal of the second sorting/conveying line 21, and an empty bucket storage line 39 is disposed at an upper portion of the second sorting/conveying line 21.

A terminal unit receives necessary data for zone/shelf allocation such as store data/category data and so forth before order-receiving batch execution. When the case unit article flows in the zone, the bar code reader BCR 32A provided at an entrance of each zone scans article item data. A necessary case is stopped based on the article item data, and label issuance, fetching indication, such as case, singleness, and shelf compartment accommodating indication, such as case, singleness, are performed.

When the bucket is filled with the articles at the shelf compartment 35, an empty bucket 4 is pushed into the compartment while attaching a label 5 issued by a label issuing machine provided at the zone compartment to the empty bucket 4. It is possible to use each compartment pressing button or equipped scanner (handy type bar code reader) or the like for the input method of a shelf compartment number.

Changing of the bucket for throwing-in a single article can be performed depending on full space judgment input of an actual commodity therefore, issuance or throwing-in a of content list for every bucket can be performed in accordance with each field. Also, it is possible to use a conventional method for performing a changing indication of the bucket while performing label issuance automatically after constant volume calculation for every bucket beforehand.

It is also possible to allocate a compartment 36 by case unit other than a single article throwing-in step for every store and for every category. With respective case unit throwing, it is possible to attach the label manually by manpower at the time of shelf compartment accommodation by issuing the label automatically by the label issuing machine provided at the zone compartment. It is also possible to cope with different label formats or different attaching positions for every client.

In one embodiment, there is provided the BCR 32A at each zone entrance. However, it is possible to perform trace control for every one case with a photoelectric switch and a stopper at every zone by scanning upstream at one place.

By installing a scanner at each zone independently, it is possible to provide an inspection function of the method of performing negation of compartment indication while scanning JAN code printed on an actual commodity at the time of picking. Further, it is possible to work with "billing (results data transmission to superordinate CPU)" by actual commodity input data.

Namely, there is provided a shipment zone for every store at the segmenting zone 32. It is thereby possible to perform inspection of a sorted commodity for the retailer while performing actual commodity input of the sorted commodity by a completion button switch input (completion button switch 32B in FIG. 1) equipped on a throwing opening for respective compartments 35, 36 of the segmenting zone 32 or scanner input, or scanner input (scanner 32C in FIG. 4) equipped on the deacquisition opening. Furthermore, there is provided a shipment zone for every returned article supplier at the segmenting zone 32, so that it is also possible to perform inspection while performing actual commodity input of the sorted commodity for the returned article supplier by scanner input (scanner 32C in FIG. 4) equipped on a deacquisition opening of respective compartments 30, 36 of the segmenting zone 32 (FIG. 4).

Specific methods of inspection assurance will be described later in detail.

(3) Large Case Article Sorting Line 41

The large case article sorting line 41 has a branch line 42 and a surplus article return line 43, and sorts articles made to order that is comprised of case articles mainly with no requirement of segmentation to enter the article made to order in the roll box 44. Reference numerals 45A, 46A indicate bar code readers BCR. Reference numeral 45B indicates fetching indicator, and a reference numeral 46B indicates a completion button switch.

(4) Preliminary line 51

The preliminary line 51 has a branch line 52 and a surplus article return line 53. Line increase is easily performed. When an order of two system segmenting zone conveying line is 19 articles each, flowing of two cases containing 20 articles each generates "plural surplus articles" of one each. In such a case, processing for combining two surplus articles into one can be considered. However, the actual commodity can be only one, although surplus articles are assumed to be two. With respect to this combining function, it can be considered that processing of the surplus articles is more easily performed at "downstream surplus article processing step such as $TC_S$ or $S_p$ or the like". Reference numerals 54A, 55A indicate bar code readers BCR, a reference numeral 54B indicates fetching indicator, and a reference numeral 56 indicates a pallet. It is also possible to drop sorted commodity of large size into the pallet 56.

(5) As to the Second Sorting in the Second Sorting/Conveying Line 21, the Following Application Examples are Possible.

A. The required number of articles is fetched, and the articles are put on the shelf to a rotational shelf throwing compartment, so that it is possible to confirm the final remaining number as zero.

B. The branched style of packing article is conveyed as it is, the remaining number is checked after stopping and placement on the shelf in every zone, and circular flowing return, to the first sorting is performed.

C. The required number of articles is fetched, the articles with case style of packing are conveyed, stopped, put on the shelf, and the surplus article are returned in every zone, so that it is possible to confirm the final remaining number as zero.

D. The required number of article is fetched, and the case style of packing is separated by required quantity in the store unit. The article is accommodated in a tray, stopped, and put on the shelf for every zone, so that it is possible to confirm the final remaining number as zero, being available for return, consolidated article, single article, and return for every manufacturer.

(Operation and Effect of the Sorting Apparatus 10)

According to the sorting apparatus 10, the following operations and effects are achieved.

(1) Since surplus becomes zero after the second sorting, it is possible to find the sorting error (second sorting).

(2) Since unnecessary article returns while riding the entire loop of the sorting line 11 or unnecessary articles are sorted to the downstream of surplus article branch section 14 (overflow line), it is possible to find different items of article and surplus quantity.

(3) It is understood that incompletion store is short at the time of batch completion, where throwing is completed, in the state of no article on the line. Since the sorting result is decided by performing forced completion, billing of decided shipment is performed. Also, data is possible.

(4) Parallel layer flowing work (work in parallel) can be performed while combining the first sorting/conveying line 11 and a plurality of second sorting/conveying lines 21.

(5) When unnecessary articles flow, the necessary article is sorted by the first sorting, and the unnecessary article is conveyed to the surplus article branch section 14, so that it is possible to perform selection such as waiting for the next batch driving and so forth.

(6) The delivered article box with label is put on a tri-dimensional moving shelf after the branch of the second sorting/conveying line 21. It is possible to perform many segmented deliveries by performing segmented distribution to a large number of shelf compartments in accordance with shelf indication lamp and so forth.

(7) Label, format, attachment and so forth which are different for every client are simplified in such a manner that a different second sorting/conveying line 21 takes charge of these works respectively.

Further there are following operations and effects specifically.

(8) The sorting apparatus 10 is effective because it is possible to perform both singleness segmented sorting and the second sorting in the case unit, and it is possible to cope with variation of order content.

(9) It is possible to perform distributive processing such as inclusion work, packing work or the like while fetching articles from the backside of the moving shelf in parallel to the second sorting work.

(10) Since there is provided a plurality of second sorting/conveying lines 21 in parallel, processing speed becomes fast in comparison with the series maximum line.

(11) It is possible to separate the work depending on the client and to make the lines take charge of different work respectively since there are a plurality of the second sorting/conveying lines 21. It is possible to use one line for sorting the single article, and the other line as a consolidated case content inspection zone, so that it is possible to apply the apparatus flexibly for multiple objects.

(12) Necessary total quantity is passed, and surplus articles are sent quickly to another fractionating zone, due to actual commodity ascertaining inspection at the fractionating zone 31.

The fetching indicator 31B of the fractionating zone 31 instructs the necessary amount of fetching in "case unit", on which occasion, it is possible to use the method for performing rearranging with scanner inspection to "conveying tray" with a bar code in accordance with instruction after performing segmenting instruction for every "store".

It is not necessary to perform segmentation at the segmenting zone 32 because of previous fractionation for every store. Only a fetching indication lamp and a throwing indication/completion press button lamp are necessary, so that it is possible to remove a digital quantity indicator.

It is possible to apply to the "return fractionating work" in every manufacturer, or in every dealer.

[Inspection and Assurance System]

A delivery inspection center 1 has an inspection and assurance system 100 in the sorting apparatus 10. The system collects actual commodity information passing the first sorting/conveying line 11, the second sorting/conveying line 21, and calculates sorting results for every retailer and delivery results for every supplier, reports the sorting results of the retailer to the retailer concerned, and the delivery results or the supplier and the sorting results for retailers relating to the delivered commodities of each supplier to the supplier concerned. The inspection and assurance system 100 has the characteristics described below.

The inspection and assurance system 100 has a receipt of order processing computer 101, a physical distribution computer 102 and a control computer 103. The system 100 receives order information in accordance with flow of the order information described below between the inspection and assurance system 100 and a retail business head office computer 200, and transmits clearance information in accordance with flow of clearance information described below.

Figure 5:
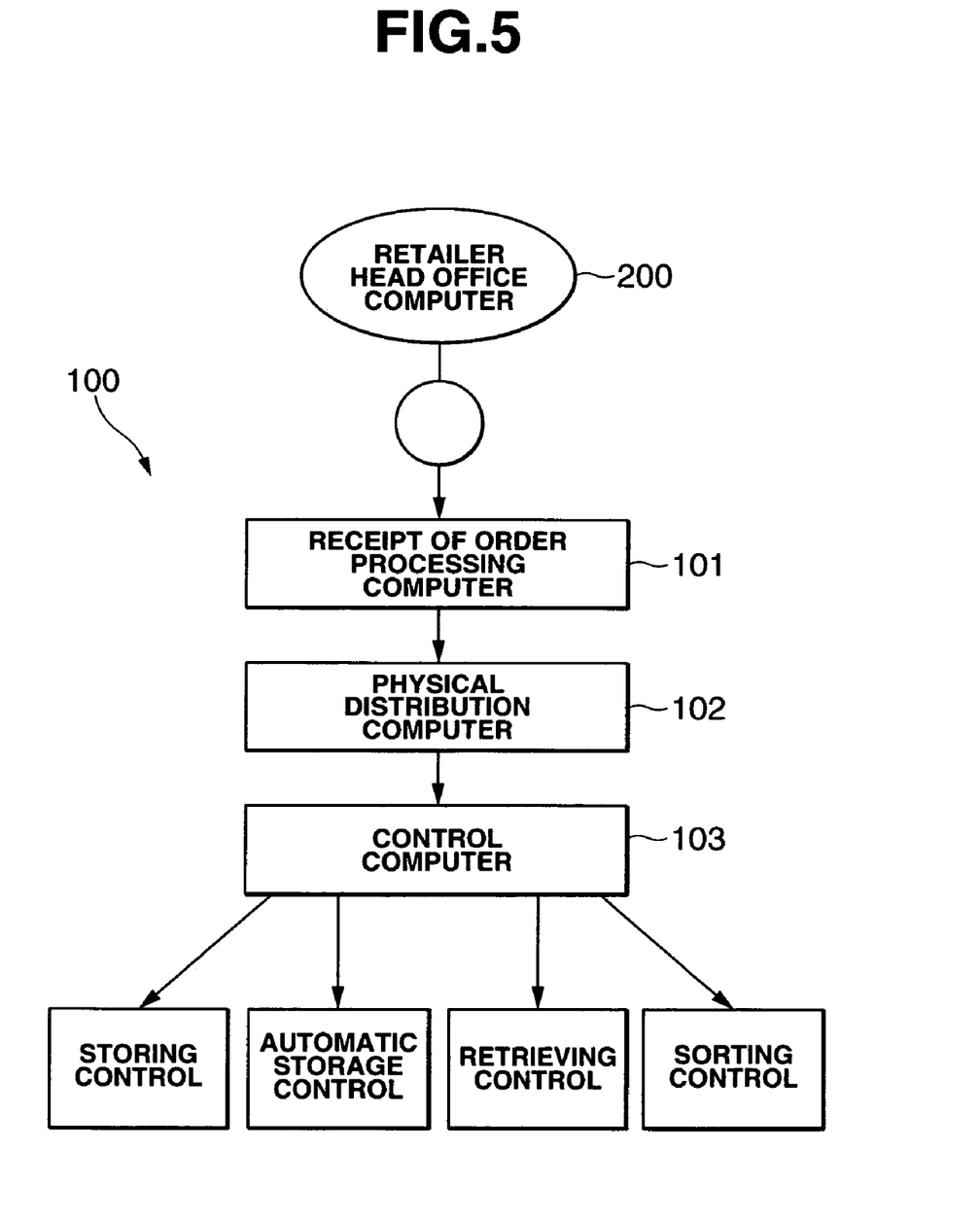
FIG. 5 is a flow diagram showing a flow of order information.

(Flow of Order Information) (FIG. 5)

(1) The Retail Business Head Office Computer 200

The retail business head office computer 200 functions as an order purchase processing means, registers commodity master file, supplier code, destination store code and so forth into storage means, and performs order processing.

(2) The Receipt of Order Processing Computer 101

The receipt of order processing computer 101 functions as a receipt of order and shipping order processing/billing processing means, registers commodity master file into storage means, and performs receipt of order processing, receipt of order data administration, receipt of order stock correspondence, and shortage list output for every supplier.

Specifically, the receipt of order processing computer 101 receives totally the shipping order sent from the retail business head office computer 200 to perform the receipt of order and shipping order information administration and the billing.

Data content of shipping order information includes a supplier code number, store code number (delivering person and delivered person), JAN code, name of article, the number of articles, case shipment order quantity, singleness shipment order quantity (article delivery content), purchase price, retail price (commercial price) or the like. Category code numbers for classifying into daily necessities, stationary, health food are numbered. In some cases, a display shelf number is added.

(3) Physical Distribution Computer 102

The physical distribution computer 102 functions as physical distribution planning means, and performs rearranging of delivery course order, loading car dispatch planning, style of packing, stock correspondence in every location, fetching location instruction, and shipment batch planning delivering.

Specifically, the physical distribution computer 102 removes commercial price data (no necessity) from receipt of order and shipping order information, and performs editing of writing to delivery division. Delivery order tables are formed based on map information beforehand.

When stock shipment division is provided (No. 1 storage, No. 2 storage and so forth), check of over-and-short of stock is performed for every location in accordance with its division to perform fetching location specification, or to perform fetching location specification without performing checking.

Destination information may be a delivery course number or store course number, which is prepared as issuance data of the label during handling process.

The shipment batch planning is executed in bulk after reaching a constant amount when the receipt of order is repeated, or in the case of presence of large number of receipt of order at one certain time a day, the shipment batch planning is executed in a certain time with constant intervals. Information transfer to the control computer is performed while deciding the size of the batch with shipment conditions considered such as the capacity of shipment handling over of a plat form or the necessity of precedent accomplishment of priority shipment article. This shipment batch unit becomes a result report unit after execution.

(4) Control Computer 103

The control computer 103 functions as a control means, and performs shipment batch data reception, batch execution administration, branch destination location allocation processing (real time control), and equipment control unit conveying instruction (conveying instruction data of source and destination).

Specifically, the control computer 103 receives shipment batch plan data formed by the physical distribution computer 102, and supplies operation instruction data in real time appropriately while confirming the operation state in every constitution control equipment individually.

The control computer 103 instructs "storing/delivering mode, storing/delivering shelf location" to each machine of the stacker crane of "automatic storage", When an execution completion signal is input, the control computer 103 outputs next instruction data.

In the case of "delivering control", the data is decided depending on kind of handling equipment. For instance, in the case of a layer unit gripping apparatus (the Japanese Patent Application No. 2000-391464), conveyed article identification information or baggage height data are input as actual commodity identification data. Therefore, data of "fetching layer number, gripping depth, gripping strength, destination or the like" are transmitted.

In the case of "sorting control", identification information of the bar code or the like, including two dimensional code or ID chip, attached to conveyed article carried in the conveying line is input, while corresponding to this information, "branch destination" is given. By this means, regular sorting control ends. In the present invention, since the second sorting after branching exists, if the branch signal is input, "zone number, accommodation compartment location number, accommodation number indication data, commodity confirmation bar code data, and label issuance data" are output additionally. Further when a fractionating process is provided, "fractionating, necessary total number, surplus article returning number specification, and label issuing data" are output additionally. After outputting, indication and so forth is performed by a field control circuit. The data is subjected to negation depending on a "completion button input" by the operator, and it is input as "results data" that is stored in "accommodation result table every store" and is transmitted to an upper computer such as the physical distribution administration computer and so forth to output "billing processing data" based on results data.

Besides, it is possible that the control computer is put together into one large type computer. Or, it is possible that there are provided respective servers, and further terminal unit performs distributed control.

(5) Process of Order Information for "Picking and Inspection Information"

The physical distribution computer receives order information (form information) from a receipt of order computer as original data, processes the original data into a form capable of being executed by the control computer, and transmits the processed data to the control computer as "batch editing data". The control computer executes "picking" in the case of the presence of a stock fetching location specification (DC) with the data as the original data. The control computer confirms results through the "inspection and assurance system", and after that, outputs "billing processing data" as the results data for those higher than the physical distribution computer. Further, when a stock fetching place is a remote place, the same output is made via the "inspection and assurance system" by carrying on (TC) passing type processing while fetching the stock from that place.

Basic "batch editing data" is shown in the form of tables such as for instance table 1, and table 2.

TABLE 1

(Physical distribution database)

Delivery course
Customer code
Destination store code
Article item code
Number in packing
Packing shipment quantity
Singleness shipment quantity
Category division
Sorted division Batch number is added and batch division is added when the number of sorting division reaches a certain number. This judgment is performed by facility frame or by a person.

TABLE 2

(Batch database)

Batch number
Fetching place division
Article item code
First in first out specification
Packing shipment quantity
Singleness shipment quantity
Sorted division
Destination store code This data is sent to the control computer. Besides, such assignment is one example. It is possible that the order data process of the physical distribution computer can be taken on as the role of the control computer.

The control computer allocates compartment location based on the above-described "batch editing data" while separating into case accommodating compartment and singleness accommodating compartment or into category division in every destination store or further segmentation in accordance with the sorting division. No allocation is performed for the branch line or its second sorting accommodation compartment that is in use at present or incapable of being used (usage state is checked).

Consequently, in the inspection and assurance system 100, the following matter is performed with respect to the order information.

The inspection and assurance system 100 has storing means of the receipt of order processing computer 101 for receiving and storing the order information of the retailer, storing means of the physical distribution computer 102 for rearranging and storing the order information due to delivery division information, and storing means of the control computer 103 for allocating and storing accommodating compartment of commodity sorted for every retailer. The inspection and assurance system 100 delimits where delivery division information and the number of accommodation compartment reach fixed limits, forms batch plan information due to quantity addition for every article item of the commodity, and outputs the batch information of the article item concerned for a stock location.

Figure 6:
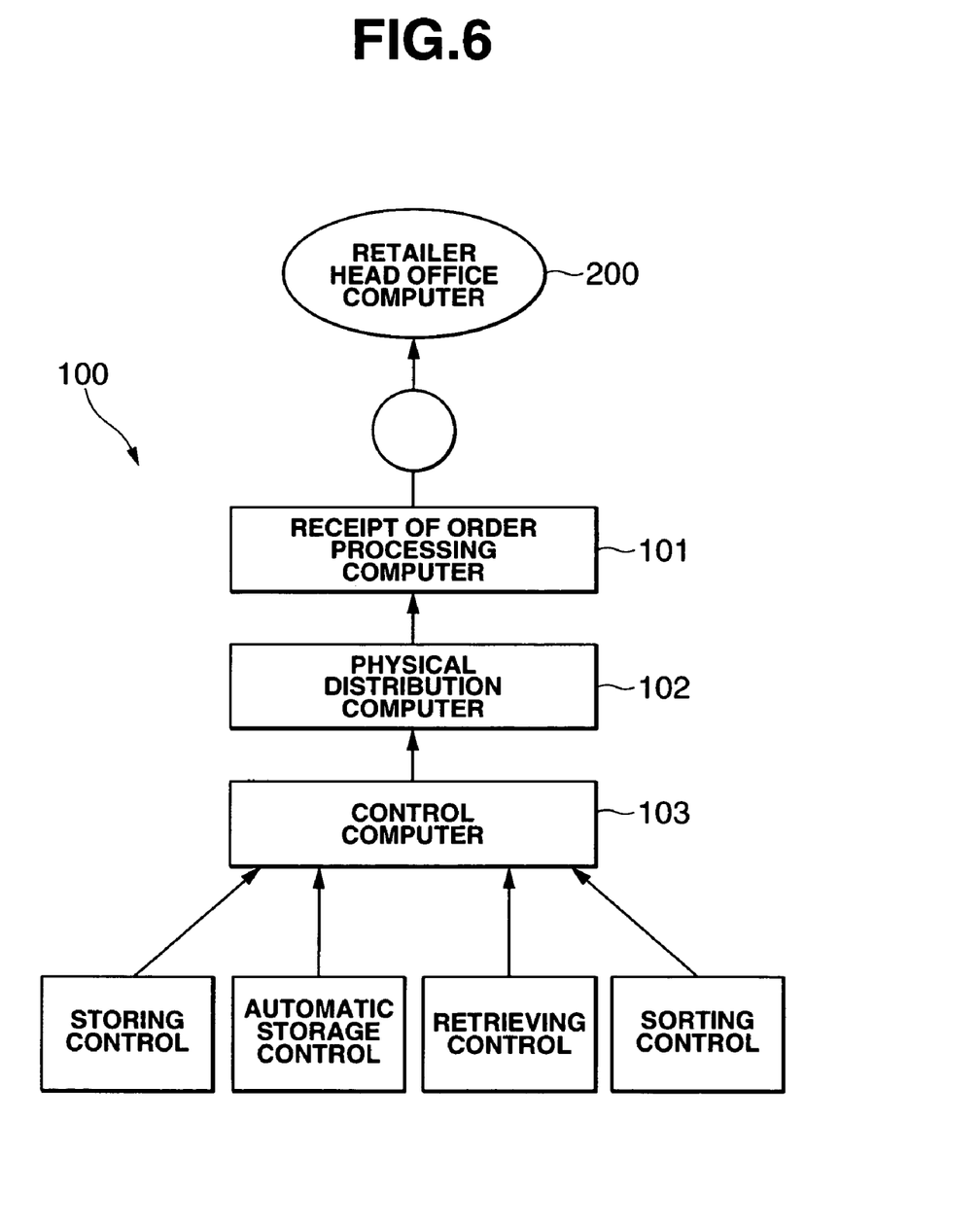
FIG. 6 is a flow diagram showing a flow of clearance information.

(Flow of Clearance Information) (FIG. 6)

(1) The control computer 103 functions as a control result information editing means, and performs shipment batch completion administration, time recording, completion administration/inspection recording for every destination, branch line destination location completion administration, and output of over-and-short report (article item difference, quantity over, short malfunction output record).

(2) The physical distribution computer 102 functions as a shipment result report provision means, and performs shipment batch counting, distinction, editing of results for every destination and shortage data, editing of supplier results and outputs shortage data, supplier article item difference, quantity over, short malfunction list, and delivery packing list in every course.

(3) The receipt of order processing computer 101 functions as an article handling over clearance information provision means, and performs billing with correction data caused by deficiency, destination store code reference delivery results, shortage list editing, supplier code reference purchase results, and shortage list editing.

(4) The retail business head office computer 200 functions as an order purchase administration means, and tracks destination store code reference delivery results, shortage list reception, supplier code reference purchase results and shortage list reception.

Consequently, the inspection and assurance system 100 performs the following matters with respect to the clearance information.

The inspection and assurance system 100 has execution control means (control computer 103) for performing the first sorting and the second sorting depending on both delivery division information and accommodation compartment allocation information for every retailer and control administration function for outputting completion information for every retailer depending on both of received article identification means (bar code reader) and error finding identification means (operator, scanner) while receiving commodity fetched from stock location to the first sorting line.

The inspection and assurance system 100 has control administration functions for outputting completion information for every retailer while performing automatic completion or forced completion of the shipment batch depending on provision completion information from each supplier or respective stock locations and sorting completion information of articles on the sorting line.

The inspection and assurance system has an administration system (the physical distribution computer 102 or the receipt of order processing computer 101) for calculating short information (shortage information) of every destination retailer for every supplier depending on completion information output for every retailer when automatic completion or forced completion of the shipment batch is performed, for adding delivery quantity correction data, and for performing billing, forms issuance, and reporting.

Moreover, the inspection and assurance system 100 performs issuance of a surplus article list, and actual commodity labeling for every supplier, about excess articles of commodity delivered from the supplier.

Below will be explained inspection processing procedures specifically of the inspection and assurance system 100.

(a) Based on location stock data of the control computer 103, fetching article item, quantity and so forth are instructed to fetch to fetching location, (supplying sections 12, 13).

(b) The fetched articles are identified by the bar code readers (BCR) 12A, 13A for each case. The flowing instruction to the sorting/conveying line 11 and the branch instruction are given to the fetched articles.

The sorting apparatus 10 is provided with a step for returning surplus articles to the sorting line while branching those that are more than the necessary total number of the article. Conventionally, the process of the sorting apparatus only sorted the articles by unit of the case or plastic container and completed.

(c) The branch separates the articles into "necessary article branch line 22" and "surplus article return line 23". In FIG. 1, both of the necessary articles and the surplus articles are branched to the branch line 22. The surplus article is pushed to the return line 23 in such a manner as to segregate the articles. Besides, in FIG. 2 described later, the necessary article is branched to the branch line 111, the segregated article is branched to the branch line 112, and the surplus article is branched to the surplus article return line 113.

In the fetching method for fetching the articles while collecting a plurality of branch lines "to round quantity to style of packing unit", there occurs the case in which "one branch destination is made to branch to round to the style of packing unit" (table 3). In such a case, one case is branched into three, and the surplus article should be returned to the sorting line 11 quickly. Consequently, the article concerned is sorted to "surplus article return line 23". Next, terminal display indicator 31B fetches a necessary quantity of 3 while performing scanner inspection to flow to the second sorting line 22. The surplus articles return to the sorting line 11 in such a manner as to adhere the label when the number is matched to the number of the display screen. The returned surplus article case is branched to the next "surplus article occurrence case branch line". In the case of a DC article, there is performed a return branching to singleness container keeping division. In the case of a TC article, there is performed return branching to TC article return line, at the stage where the whole necessary total number has completed the first branch.

(d) The necessary article, in tray, after branching, is carried out to the second sorting line 22 disposed near the moving shelf or rotational shelf. Accommodating compartment in every zone is lighted to be displayed. The necessary articles are accommodated in accordance with this digital indicator. After accommodation, a completion button is pressed to turn off. On the occasion of this working, it may be preferable that the whole number inspection is performed with the scanner attached to zone, if necessary. As to "finding of error", in the case where the compartment is lighted in spite of no article after a tray reaches the final zone. A surplus article is contained at an upstream zone erroneously. "The whole compartment re-indication confirmation and correction" is performed while stopping work to normalize. Further, in the case of presence of the article on the tray, although zero confirmation is expected on the final zone, this is also error finding, and normalization should be performed.

(e) The necessary articles which is a case article or in tray, is passed through "necessary article branch line 22" and "surplus article return line 23" and is sent to the second sorting accommodation compartment while repeating its sorting work. Thereafter, schedule completion is generated for every compartment location.

(f) On the basis of "batch editing data", the compartment filled with article item quantity of a schedule of the allocated compartment location is completed, and then destination store unit completion is confirmed. After that, the above described "billing processing data" is output.

Completion of the compartment is decided by the bar code scanner input signal about the necessary article item quantity total number of respective branch lines and accommodation completion confirmation button signal of respective accommodation compartments. Separately, at the compartment accommodating time, it is possible that actual commodity scan accommodation confirmation is also added. The article "after picking" is fetched once from a rear position of a moving shelf due to the above completion. Ii may be by the data after issuance of scanner actual commodity inspection packing label, corresponding to actual commodity packing quantity provided rearward at the time of shipment packing. Thus, completion of compartment is confirmed.

(g) If DC handling article batch plan and TC handling article batch plan are separated previously, the compartment step can be completed individually. With respect to a TC article, it is possible to perform confirmation of in execution or no arrival for every product dealer while confirming a carry in signal to storage in a warehouse line of the product dealer.

(h) Completion of batch accomplishment is automatically completed when the whole schedule article has performed its passing sorting. However, presence of a short condition does not complete the batch, and it is not possible to perform billing. In this case, "forced completion" is performed while judging from the state in the actual field. Then, "shortage data", "shortage data for every destination" are created to output to upper computer.

TABLE 3

| 1 Container (containing 15 articles) | | | |
| --- | --- | --- | --- |
| Branch destination | Necessary number | Branched number | Remaining |
| 01 | 3 articles | 1 Container (15 articles) | 12 articles |
| 02 | 3 articles | 1 Container (12 articles) | 9 articles |
| 03 | 3 articles | 1 Container (9 articles) | 6 articles |
| Surplus | | | 6 articles |

(Operation and Effect of Inspection and Assurance System 100)

In case of a condition with the order information as the reference, presence of a limitation brings incomplete coincidence between order information issued from the retail head office to the actual condition. Frequently, it is not possible to cope with serious short production and sudden requirements depending of variation of the season because of the limitation of time.

Consequently, it becomes necessary to perform clearance with the information from the actual field as to correctness while replacing the upper information into the field information with the actual field as the reference in the business process between the companies such as order, delivery, inspection, clearance, and payment.

The present invention provides an inspection and assurance system 100 in which the system, with the order information as the original data, collects actual commodity identification data obtained from identification information of the article passing through TC sorting/conveying system, issues delivery forms data in every destination while adding corrected information, and transmits results data to the destination retailer head office or supplier side administration computer. The results data is taken to as originated clearance data. The inspection and assurance system 100 has the following operations.

(1) Since the billing is performed based on the actual commodity reference data, the forms always coincide with the actual commodity. By this means, the delivery driver only receives confirmation of delivery packing numbers at the time of commodity reception at a storefront. Thus it is possible to eliminate time for mutual presence for content inspection of multiple item consolidated packing articles or the forms correction procedure. This is the storefront elimination labor effect.

(2) It is possible to quickly decide a debt or a charge account by transmitting results data to the administration computer of the destination retailer head office or supplier side. It is possible to perform accurate payment while eliminating miss match between actual commodity and payment by eliminating time for data correction because of results data reference. This is the accurate payment effect.

(3) It is possible to accurately perform purchase procurance planning because early stock data update is performed by results data depending on "shipment batch completion of center sorting/conveying system" with respect to stock information of the administration computer. This is the early update effect of tab data.

(4) It is possible to obtain "excess and deficiency information" of the commodity carried into the center by a "shipment batch completion of center sorting/conveying system". With respect to an "excess article item", a return list is output for every supplier. With respect to a "shortage article item", the shortage of which destination is output in every supplier. These are the reports of difference between order information and results information. This clarifies error in the actual field. It is thereby possible to perform recovery as the action improvement information. This is the grasp of malfunction and its countermeasure effect.

(5) It is possible to search for a cause when an accident, food poisoning, foreign particle interfusion, defective or the like, occurs caused by shipment commodity, because a record of passing commodity and time is kept depending on results data by "shipment batch completion of center sorting/conveying system" while tracing the record. This is the risk management quality assurance effect.

(6) Similarly, the data of the actual results can be used as the material for productivity improvement for utilizing the center facilities effectively such that personnel arrangement or time-designating adjustment for an arrival commodity is performed by grasping busy and idle time bands from the passing record for each time. This is the center utilization promotion/productivity improvement effect.

(7) It is possible to achieve simple and accurate return assurance by using the inspection and assurance system also as return assurance.

As described above, "article handling over clearance" is performed in such a manner as to perform concentration integration utilization of "shipment batch completion of center sorting/conveying system" originated data of TC with respect to unclearness and a wide clearance work of actual commodity handling over relating to the business transaction. Thus, the shipment batch completion of center sorting/conveying system originated data is taken to as "business transaction clearance originated data".

Besides, when the commodity does not arrive at storefront as a result of an accident, a receipt report is not input to the retailer head office from the storefront. Therefore clearance is not performed.

Further, when part of the commodity is short, it is possible to correct data by inputting a short report to the retailer head office.

(Return Assurance Function)

The inspection and assurance system 100 can be utilized for return assurance too. Namely, the inspection and assurance system 100 establishes a shipment zone for every return destination trader at the second sorting/conveying line branched from the sorting/conveying line, and compiles and outputs return sorting results for every retailer and return results for every supplier by actual commodity input identification means of sorted commodity for the return destination trader in the form of a report.

The process of return assurance is as follows.

1. The physical distribution computer 102 specifies the day of the return of a return batch and its batch number, establishes a "return mode" to the control computer 103, and establishes a first branch destination, and second sorting zone. It is preferable that the second sorting zone is established in every supplier.

2. Flowing of return (consolidated packing, case article) is made to perform for the actual field first sorting line. Store code establishment or issuance addition of store code label is performed and the first branch destination is made to allocate, after identification by the scanner.

3. After branching of the return from the first sorting line, single article segmentation (inserting in tray) and JAN code identification in the return are performed, before sending to the second sorting line.

4. When the return arrives at the supplier concerned establishment zone, it is stopped, its accommodation compartment is made to indicate, the return is accommodated in corresponding compartment, and the completion button is pressed.

Return accommodation compartment within the supplier establishment zone is established in such a manner as follows:

A. Method for separating into compartments in every category of specified drug medicine, quasi-drug, food, cosmetic and so forth, and other categories.

B. Method for separating into compartments for specified manufacturers and other manufacturers.

C. Method using both above A and B simultaneously. This is establishment free.

D. It is also possible to return remaining articles to the surplus article line, after extracting to segregate only specific manufacturers.

In the case of A, because of every category, articles for a plurality of manufacturers are sorted in the same compartment. In the case of B, it is possible to collect articles of consignment sales contract manufacturer and so forth specifically.

(Merit of Return Processing Report)

Drug medicine for which an expiration date is determined by the law, or foods of which best before indication is obligated can be returned. Alternatively, in some cases, a return system depending on contract may be established.

At the time of turning of the seasons, or at the time of clearance processing correspondence, "return" is returned from retailer. In this case, it is possible to search the manufacturer name depending on JAN code. However it is difficult to search the supplier (commission agent name or agent of manufacturer).

Zone establishment (small supplier may be of compartment establishment) for every supplier (customer code establishment) is performed at the sorting/conveying line. By this means, the following merits are obtained.

(a) It is possible to perform classification arrangement of the articles for every supplier. It is possible to perform a label attaching indication to the box in the actual field.

(b) Counting of returns, and article item quantity for every retailer can be performed. It is possible to perform adjusting and accounting purchase amounts of money (purchase reduction).

(c) Counting of returns, and article item quantity in every supplier can be performed. It is possible to adjust and account for sale proceeds. In the case of sale proceeds reduction, it is possible to find fictional sales proceeds.

(d) The consignment sale contract manufacturer or specific manufacturer are specified, so that it is possible to adjust its handling over an article item and quantity depending on the classification arrangement and counting.

(e) In the case of the specification of an object article for performing waste treatment, it becomes possible to perform reception and deacquisition quantitatively and effectively by article segregation, label indication and counting lists, so that calculation of the treatment fee is facilitated, and statistical data is aligned.

(f) Such return adjusting processing is performed on non-working days of the inspection and assurance center, so that a conventional return dedicated center becomes unnecessary, with a resulting large cost reduction.

Figure 2:
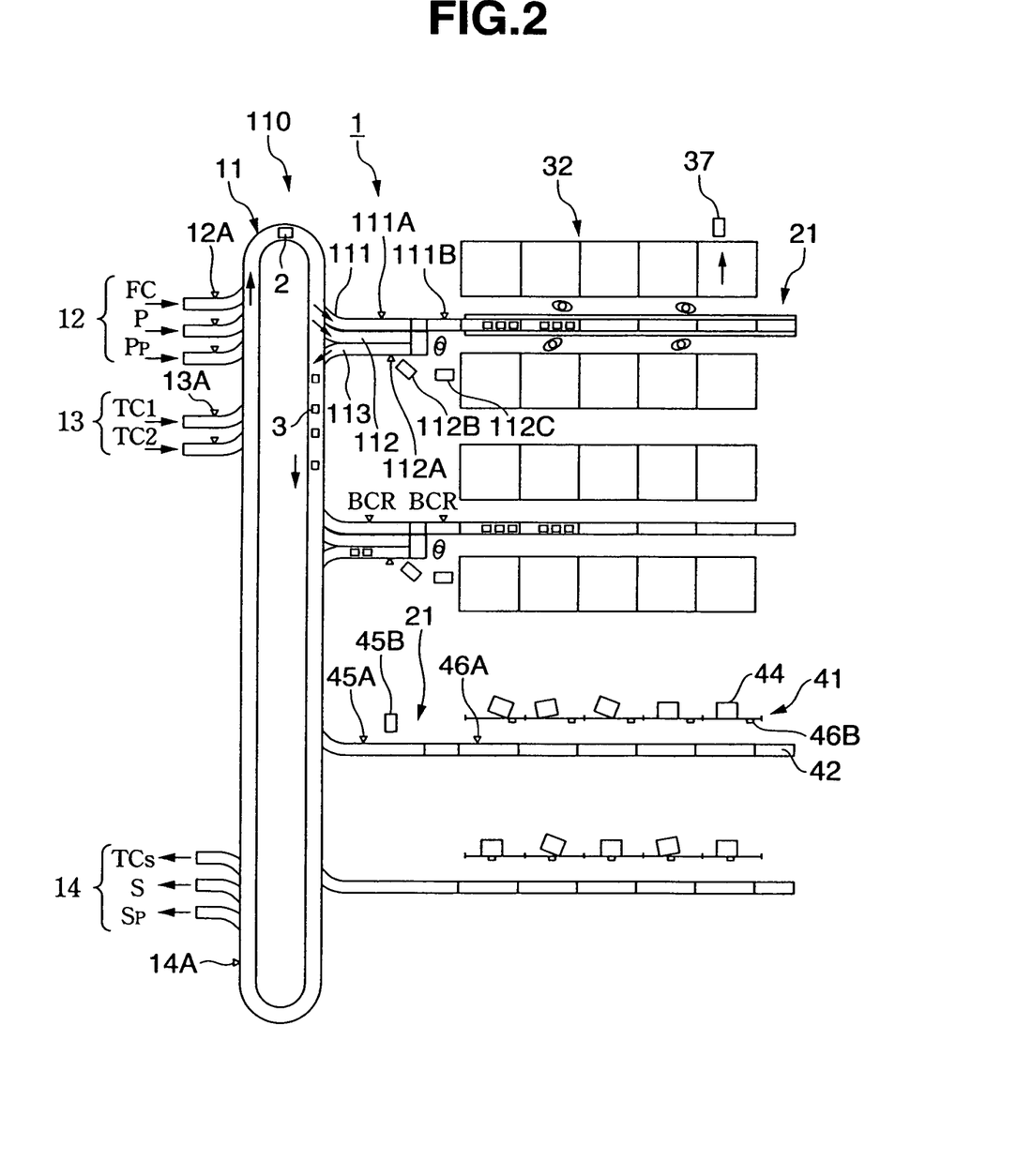
FIG. 2 is a schematic diagram showing a second embodiment of the sorting apparatus.

The Second Embodiment (FIG. 2)

The sorting apparatus 110 shown in FIG. 2 differs from the sorting apparatus shown in FIG. 1 such that the second sorting/conveying line 21 is provided with the case unit passing article branch line 111, surplus article segregation branch line 112, and surplus article returning line 113. The sorting apparatus 110 is effective when the case unit branch amount from the first sorting/conveying line 11 to the second sorting/conveying line 21 is large.

The case article branched to the case unit passing article branch line 111 is read out by bar code reader BCR 111A. Further, the case article is read out by bar code reader BCR 111B provided at the entrance of each zone of the segmenting zone 32. The case article is sent to a corresponding zone based on the read out data.

The commodity branched to the surplus article segregation branch line 112 is read out by a bar code reader 112A. The fetching indicator 112B performs the fetching indication of a necessary quantity and surplus article. The operator sends the necessary article for each zone of the segmenting zone 32 while utilizing the case unit passing article branch line 111, and the bar code reader 111B. The operator sends the surplus articles to the first sorting/conveying line 11 from the surplus article returning line 113 while attaching a label issued by the labeler 112C.

Figure 3:
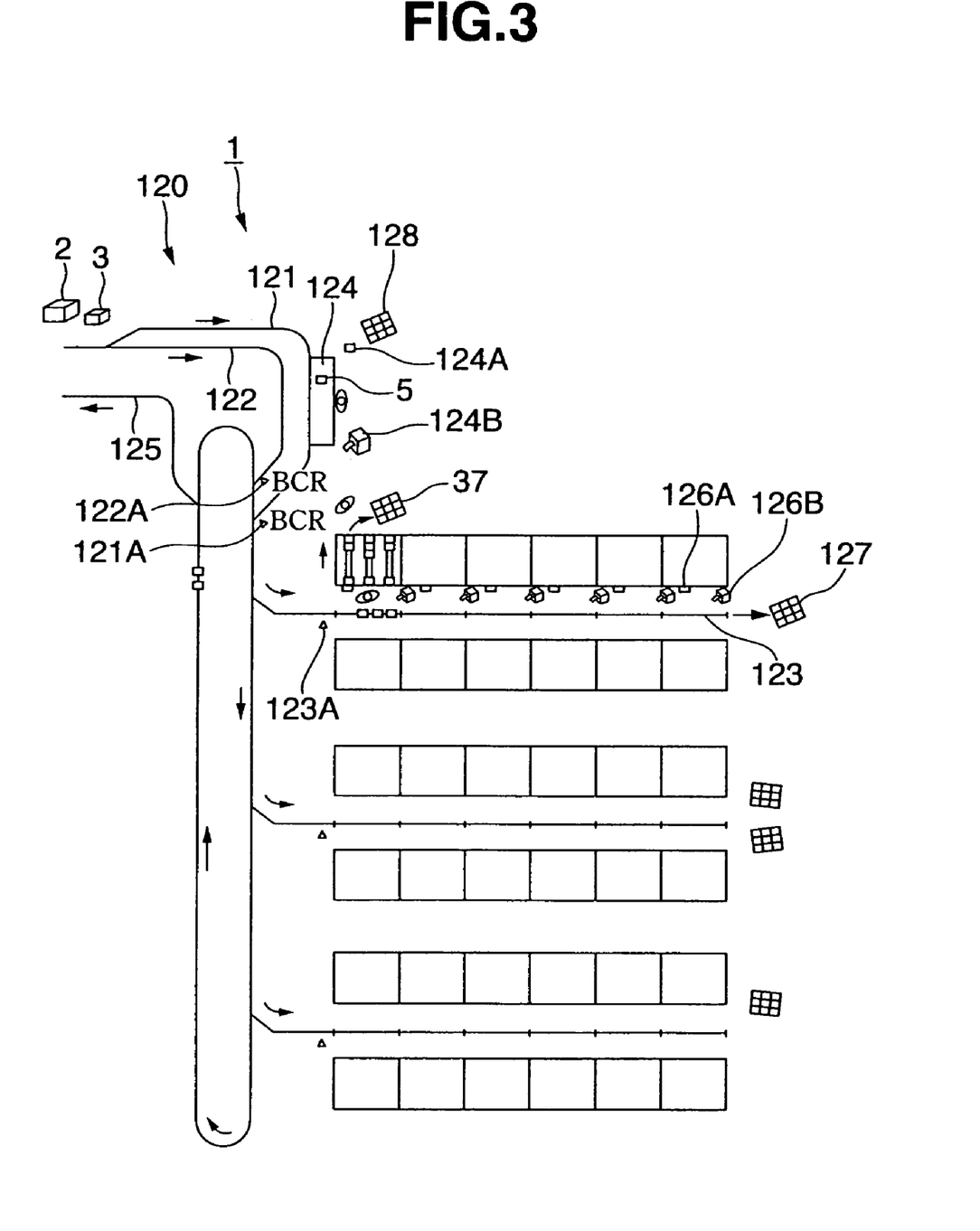
FIG. 3 is a schematic diagram showing a third embodiment of the sorting apparatus.

The Third Embodiment (FIG. 3)

The sorting apparatus 120 shown in FIG. 3 differs from the sorting apparatus 10 shown in FIG. 1 such that there are provided a subsection line 121 and a pass line 122 as a commodity provision system for the first sorting/conveying line 11. A plurality of second sorting/conveying lines 21 are constituted by the branch lines 123 which are not necessary to be returned and are taken to be dedicated lines in every area A, B, and C. The sorting apparatus 120 separates the commodity of single article case 2, or singleness container 3, introduced to the subsection line 121 into necessary article and surplus article of each area A, area B or area C based on instruction of subsection indicator 124A of subsection working area 124. The necessary articles are subjected to subsection into tray 5 in each area A, area B, area C. A label issued by the label issuing machine 124B is attached to this tray 5. Bar code reader BCR 121A of the exit of the subsection line 121 reads out the label of each tray 5. Thus, the respective trays 5 are sorted into corresponding area A, area B, and area C of the branch lines 123. The commodity branched to surplus article at the subsection line 121 is inserted in single article case 2, or singleness container 3, to be sent to the return line 125 from the first sorting/conveying line 11.

The commodities sorted to the branch line 123 of each area A, area B, area C are stopped at the corresponding zone of the segmenting zone 32 based on data read out by the bar code reader BCR 123A. The indicator and completion button switch 126A, and label issuing machine 126B are provided for each zone. The commodity to be inserted into the compartment of each zone is inserted into an empty tray or empty container. After that, a label issued by the label issuing machine 126B is attached to the tray that is crushed in the compartment.

The pass line 122 passes the case unit sorting necessary article of respective area A, area B, and area C, and sorts these case articles into the branch line 123 of the corresponding area on the basis of read out data of the bar code reader BCR 122A of the exit. The case articles sorted to the branch line 123 of respective area A, area B, and area C are stopped at the corresponding zone of the segmenting zone 32 on the basis of the read out data of the bar code reader 123A. Thereafter, a label issued by the label issuing machine 126B of each zone is attached to the case, to be inserted into the corresponding case compartment.

There is provided an empty tray collection place 127 at the end portion of the branch line 123, and there is provided an empty tray storage site 128 at the subsection working place 124.

As described above, the embodiments of the invention are explained depending on the drawings, however, specific constitution of the present invention is not limited by the embodiments described above, and also if embodiments except for the aforementioned embodiments fall in the range without departing from the scope and the spirit of technical consciousness according to the present invention, various kinds of modifications and changes are possible depending on design and so forth, and are included in the present invention. For instance, the inspection and assurance system of the present invention is not limited one which is executed in the delivery inspection center 1 provided with the sorting apparatus 10, so that the inspection and assurance system is widely adopted in the delivery inspection center provided with various sorting apparatus.

INDUSTRIAL APPLICABILITY

As described above, according to the present invention, it is possible to perform inspection and assurance accurately and effectively while sorting commodity delivered from the supplier.

Further according to the present invention, it is possible to perform inspection and assurance instead of the supplier or the retailer by a delivery inspection center provided between the supplier and the retailer.

What is claimed is:

1. A sorting method which uses a sorting/conveying line with a branch destination comprising the steps of:
   sorting the commodities more than a quantity required for the branch destination;
   returning surplus commodity after removing a required quantity to the sorting/conveying line;
   a second sorting/conveying step for segmenting a required quantity of commodities sorted to the branch destination from the sorting/conveying line into a plurality of shipment zones provided for the branch destinations; and
   supplying the commodity fetched by one piece unit from inside of a single article item accommodation case to a singleness compartment and a step for supplying the single article item accommodating case by case unit to case compartment at the second sorting/conveying step.

2. A sorting method which uses a sorting/conveying line with a branch destination comprising the steps of:
   sorting the commodities more than a quantity required for the branch destination;
   returning surplus commodity after removing a required quantity to the sorting/conveying line; and
   a second sorting/conveying step for segmenting a required quantity of commodities sorted to the branch destination from the sorting/conveying line into a plurality of shipment zones provided for the branch destinations;
   wherein the second sorting/conveying step is provided with a shipment zone for every retailer at the branch destination, in which the sorted commodity for the retailer is field-input to be subjected to inspection.

3. A sorting method which uses a sorting/conveying line with a branch destination comprising the steps of:
   sorting the commodities more than a quantity required for the branch destination;
   returning surplus commodity after removing a required quantity to the sorting/conveying line; and
   a second sorting/conveying step for segmenting a required quantity of commodities sorted to the branch destination from the sorting/conveying line into a plurality of shipment zones provided for the branch destinations;
   wherein the second sorting/conveying step is provided with a shipment zone for every return destination trader at the branch destination, in which the sorted commodity for the return destination supplier is field-input to be subjected to inspection.

4. A sorting apparatus which uses a sorting/conveying line with branch destination comprising:
   a branch line for sorting the commodities more than a quantity required for the branch destination; and
   a surplus article returning line for returning surplus commodities after removing a required quantity to the sorting/conveying line,
   wherein the branch line constitutes a second sorting/conveying line for segmenting a required quantity of commodities sorted to branch destination from the sorting/conveying into a plurality of shipment zones provided for the branch destination, and,
   wherein the second sorting/conveying line has a singleness compartment for supplying the commodity fetched by one piece unit from inside of a single article item accommodating case, and a case compartment for supplying the single article item accommodating case by case unit.

5. A sorting apparatus which uses a sorting/conveying line with branch destination comprising:
   a branch line for sorting the commodities more than a quantity required for the branch destination; and
   a surplus article returning line for returning surplus commodities after removing a required quantity to the sorting/conveying line,
   wherein the branch line constitutes a second sorting/conveying line for segmenting a required quantity of commodities sorted to branch destination from the sorting/conveying into a plurality of shipment zones provided for the branch destination, and,
   wherein the second sorting/conveying line comprises a shipment zone for every retailer at the branch destination, and an inspection means for performing inspection while filed-inputting the sorted commodity for the retailer.

6. A sorting apparatus which uses a sorting/conveying line with branch destination comprising:
   a branch line for sorting the commodities more than a quantity required for the branch destination; and
   a surplus article returning line for returning surplus commodities after removing a required quantity to the sorting/conveying line,
   wherein the branch line constitutes a second sorting/conveying line for segmenting a required quantity of commodities sorted to branch destination from the sorting/conveying into a plurality of shipment zones provided for the branch destination, and,
   wherein the second sorting/conveying line comprises a shipment zone in every return destination trader at the branch destination, and an inspection means for performing inspection while field-inputting the sorted commodity for the return destination supplier.

* * * * *